(12) United States Patent
Horiuchi

(10) Patent No.: US 6,754,009 B2
(45) Date of Patent: Jun. 22, 2004

(54) ZOOM LENS AND IMAGE TAKING APPARATUS HAVING THE SAME

(75) Inventor: Akihisa Horiuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/372,539

(22) Filed: Feb. 24, 2003

(65) Prior Publication Data

US 2003/0174411 A1 Sep. 18, 2003

(30) Foreign Application Priority Data

Feb. 28, 2002 (JP) .................................. 2002-053857

(51) Int. Cl.⁷ .............................................. G02B 15/14
(52) U.S. Cl. ..................... 359/687; 359/683; 359/723; 359/740; 359/774
(58) Field of Search ................................. 359/676, 683, 359/686, 687, 722, 723, 738–740, 774

(56) References Cited

U.S. PATENT DOCUMENTS

| | | |
|---|---|---|
| 4,859,042 A | 8/1989 | Tanaka |
| 5,189,558 A | 2/1993 | Ishii et al. |
| 5,963,378 A | 10/1999 | Tochigi et al. |
| 6,166,864 A | 12/2000 | Horiuchi |
| 6,344,932 B1 * | 2/2002 | Horiuchi ................ 359/687 |

FOREIGN PATENT DOCUMENTS

| | | |
|---|---|---|
| JP | 62-206516 | 9/1987 |
| JP | 62-247316 | 10/1987 |
| JP | 4-43311 | 2/1992 |
| JP | 5-60974 | 3/1993 |
| JP | 5-281591 | 10/1993 |
| JP | 6-224213 | 8/1994 |
| JP | 7-270684 | 10/1995 |
| JP | 11-305124 | 11/1999 |
| JP | 2000-305018 | 11/2000 |

\* cited by examiner

Primary Examiner—Evelyn A. Lester
(74) Attorney, Agent, or Firm—Morgan & Finnegan, LLP

(57) ABSTRACT

This specification discloses a zoom lens of novel construction in which ghost or flare caused by the reflection between a filter member and an image pickup surface suppressed. This zoom lens is provided, in succession from the front to the rear, with a first lens unit of positive power, a second lens unit of negative power moved during zooming, a stop unit, a third lens unit of positive power, and a fourth lens unit of positive power moved during zooming. The stop unit has a stop blade forming an aperture, and a filter member for attenuating the quantity of light passing through the aperture. The filter member is so disposed as to be inclined with respect to the optical axis of the zoom lens.

18 Claims, 7 Drawing Sheets

ZOOM LENS AND IMAGE TAKING APPARATUS HAVING THE SAME

BACKGROUND OF THE INVENTION

1. Field of the Invention

This invention relates to a zoom lens, and particularly is suitable for use in an optical apparatus such as a video camera, a digital camera or a camera for film.

2. Description of Related Art

When an object is to be photographed by an optical apparatus such as a still camera or a video camera, if the object is bright, a stop aperture (aperture diameter) is made small to thereby limit the quantity of light. When the stop aperture becomes too small, the quality of image is deteriorated under the influence of diffraction. Also, the depth of focus is increased and therefore, the imprinting of dust adhering to the surface of a lens, a filter, etc. onto a photosensitive surface also poses a problem. So, in order to prevent the stop aperture from becoming too small even if the object is bright, there has heretofore been practised a technique of not making the stop aperture smaller than a predetermined size, but bringing an ND filter into the stop aperture to thereby decrease the quantity of passing light.

For example, in Japanese Patent Application Laid-Open No. 2000-305018, in a four-unit zoom lens comprising, in succession from the object side, a stationary first lens unit of positive refractive power, a second lens unit having negative refractive power and movable on an optical axis and having zooming magnification variation operation, a stationary third lens unit having positive refractive power, and a fourth lens unit having positive refractive power and movable on the optical axis for focusing and the correction of image displacement resulting from the magnification variation operation, an ND filter is adapted to be inserted rearwardly of the third lens unit so that the stop aperture need not be made very small.

Also, when the ND filter is inserted into an optical path, in order to prevent light (object light) incident on an image pickup element such as a CCD sensor from being reflected by the surface of the image pickup element, and the reflected light from being reflected by the ND filter and being re-incident on the image pickup element, the ND filter is disposed while being inclined with respect to the optical axis.

Also, Japanese Patent Application Laid-Open No. 5-281591 discloses a stop device using two ND filters disposed so as not to be parallel to each other in order to eliminate ghost occurring when light is reflected by the surfaces of the two ND filters.

Specifically, the ND filters are mounted on two stop vanes so as to cover a portion of a cut-away for forming a stop aperture, and these two ND filters are disposed at an angle so as not to be parallel to each other. Thereby, a ray of light transmitted through one ND filter and reflected by the other ND filter, and further reflected by one ND filter and then transmitted through the other ND filter is prevented from being incident on the light receiving surface of an image pickup element so that a ghost image may not be imprinted on a screen.

A zoom lens of the so-called four-unit rear focus type having, in succession from the object side, a first lens unit of positive refractive power, a second lens unit of negative refractive power, a third lens unit of positive refractive power and a fourth lens unit of positive refractive power and in which the second lens unit is moved to thereby effect magnification variation, and the fourth lens unit is moved to thereby correct any fluctuation of image field resulting from magnification variation operation and focusing is effected by the fourth lens unit is proposed, for example, in Japanese Patent Application Laid-Open No. 62-206516, Japanese Patent Application Laid-Open No. 62-24213 (corresponding U.S. Pat. No. 4,859,042), Japanese Patent Application Laid-Open No. 62-247316, Japanese Patent Application Laid-Open No. 4-43311 (corresponding U.S. Pat. No. 5,189,558), Japanese Patent Application Laid-Open No. 5-060974, Japanese Patent Application Laid-Open No. 7-270684 (corresponding U.S. Pat. No. 5,963,378), Japanese Patent Application Laid-Open No. 7-318804 (corresponding U.S. Pat. No. 5,963,378), Japanese Patent Application Laid-Open No. 11-305124 (corresponding U.S. Pat. No. 6,166,864), etc.

SUMMARY OF THE INVENTION

The present invention has as its object the provision of a zoom lens of novel construction in which light reflected by an image pickup surface can be effectively prevented from being reflected by a filter member such as an ND filter and being again incident on the image pickup surface.

A zoom lens system according to an aspect of the present invention is provided, in succession from the front (the object side) to the rear (the image side), with a first lens unit of positive power (the inverse number of a focal length), a second lens unit of negative power moved during zooming, a stop unit, a third lens unit of positive power and a fourth lens unit of positive power moved during zooming. The zoom lens is characterized in that the stop unit has a stop blade (vane) forming an aperture, and a filter member for attenuating the quantity of light passing through the aperture, and the filter member is disposed while being inclined with respect to the optical axis of the zoom lens.

DESCRIPTION OF THE PREFERRED EMBODIMENTS

The zoom lens system of the present invention and an embodiment of an image taking apparatus will hereinafter be described with reference to the drawings.

Figure 1:
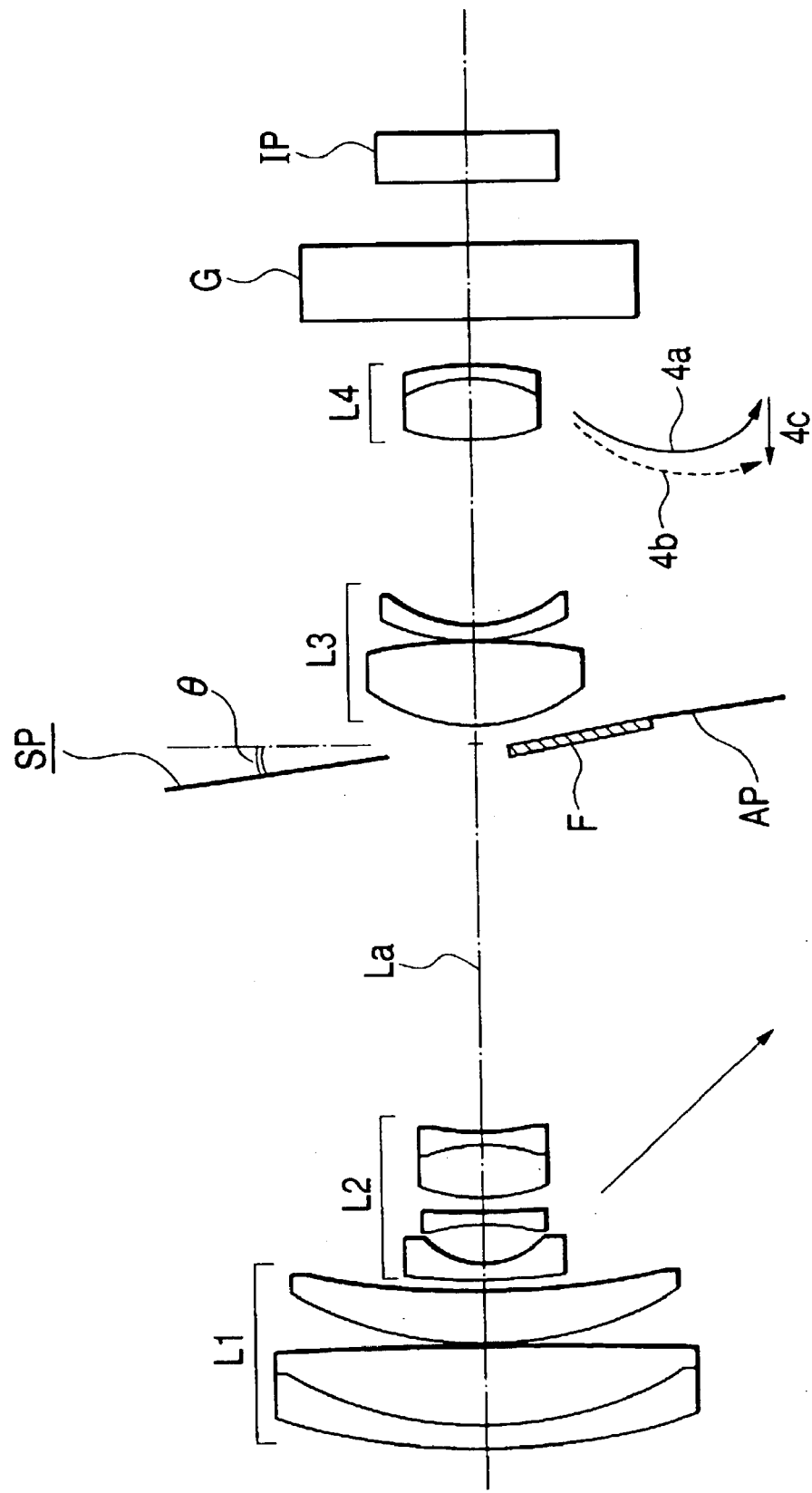
FIG. 1 is a cross-sectional view of the zoom lens of a first numerical embodiment.
Figure 2:
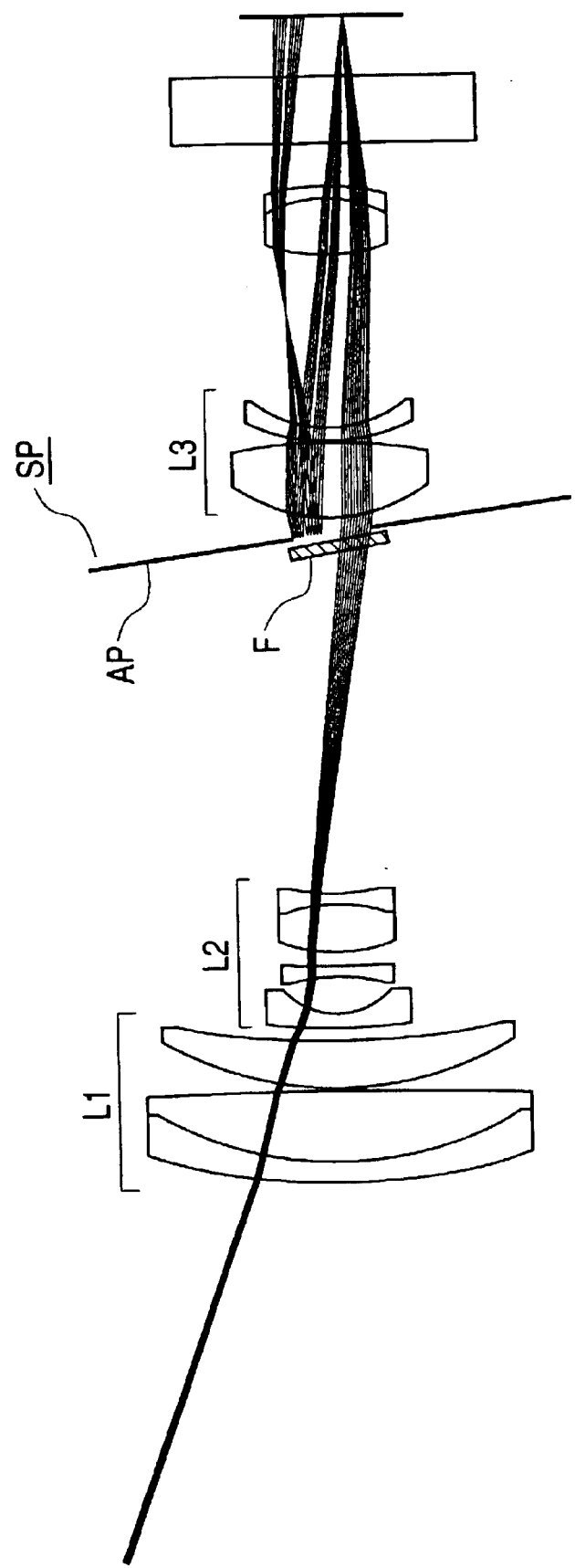
FIG. 2 shows the ghost ray optical path of the zoom lens of the first numerical embodiment.

FIG. 1 is a cross-sectional view of the essential portions of the zoom lens of a first embodiment (corresponding to a first numerical embodiment which will be described later) of the present invention, and FIG. 2 shows an optical path when in the zoom lens of the first embodiment, light reflected by an image pickup surface is reflected by a filter member and is re-incident on the image pickup surface side. When this is incident on the effective image field of the image pickup surface, it becomes a ghost. In FIG. 2, a stop is in a state in which it has been stopped down by a step from its open state. In FIGS. 1 and 2, the left side is the object side (the front) and the right side is the image side (the rear). This also holds true in second and third embodiments.

Figure 3:
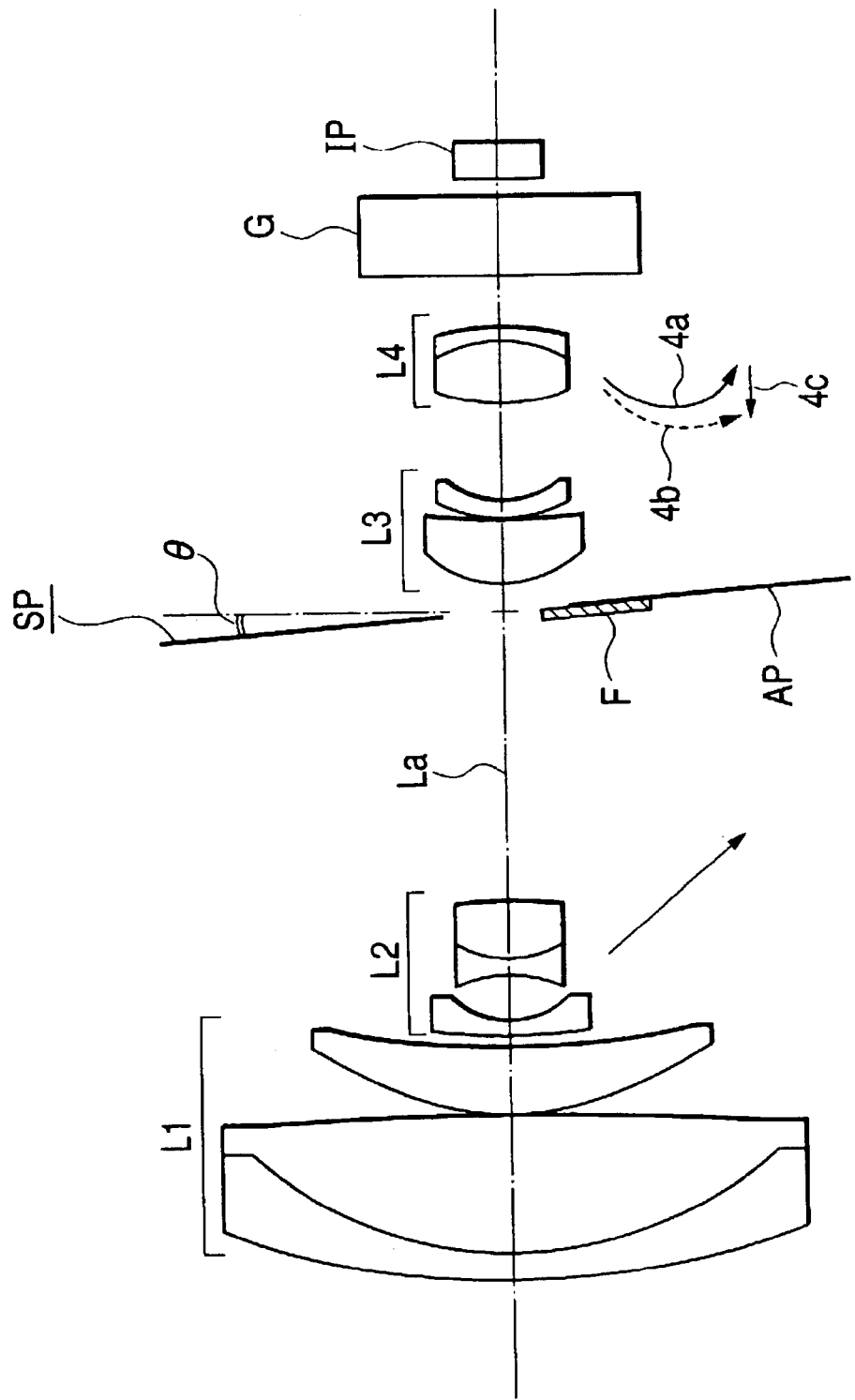
FIG. 3 is a cross-sectional view of the zoom lens of a second numerical embodiment.
Figure 4:
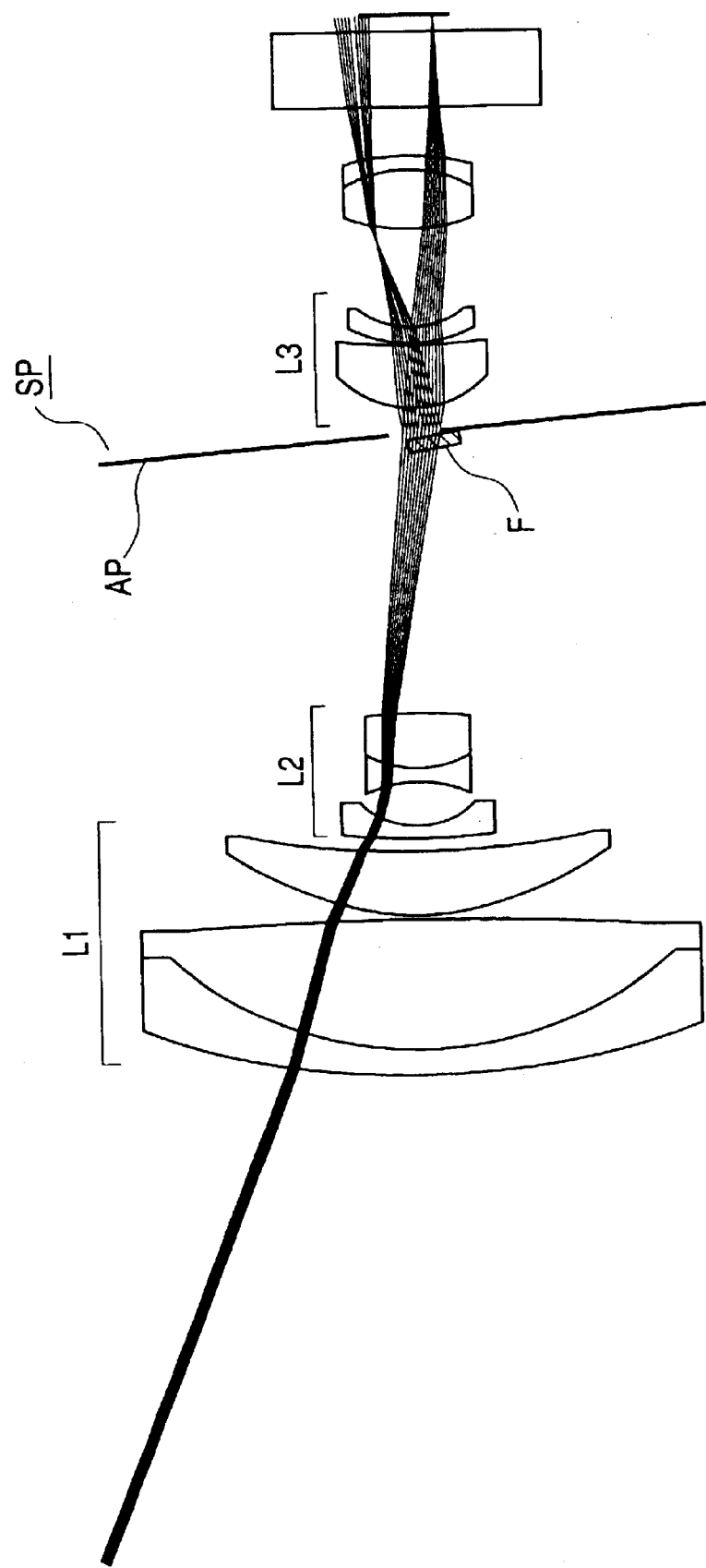
FIG. 4 shows the ghost ray optical path of the zoom lens of the second numerical embodiment.

FIG. 3 is a cross-sectional view of the essential portions of the zoom lens of a second embodiment (corresponding to a second numerical embodiment which will be described later) of the present invention, and FIG. 4 shows the optical path of ghost light in the zoom lens of the second embodiment, as in FIG. 2.

Figure 5:
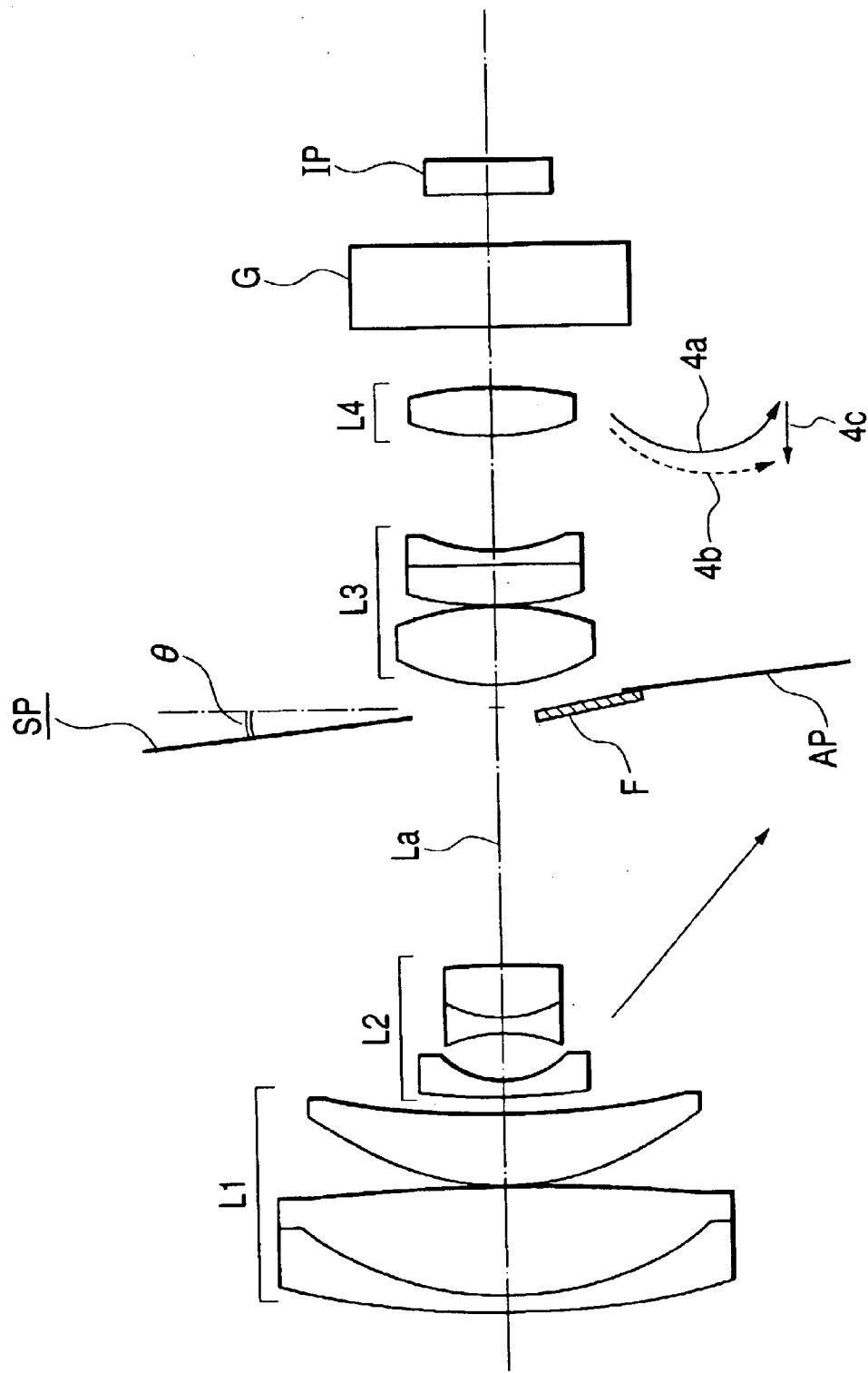
FIG. 5 is a cross-sectional view of the zoom lens of a third numerical embodiment.
Figure 6:
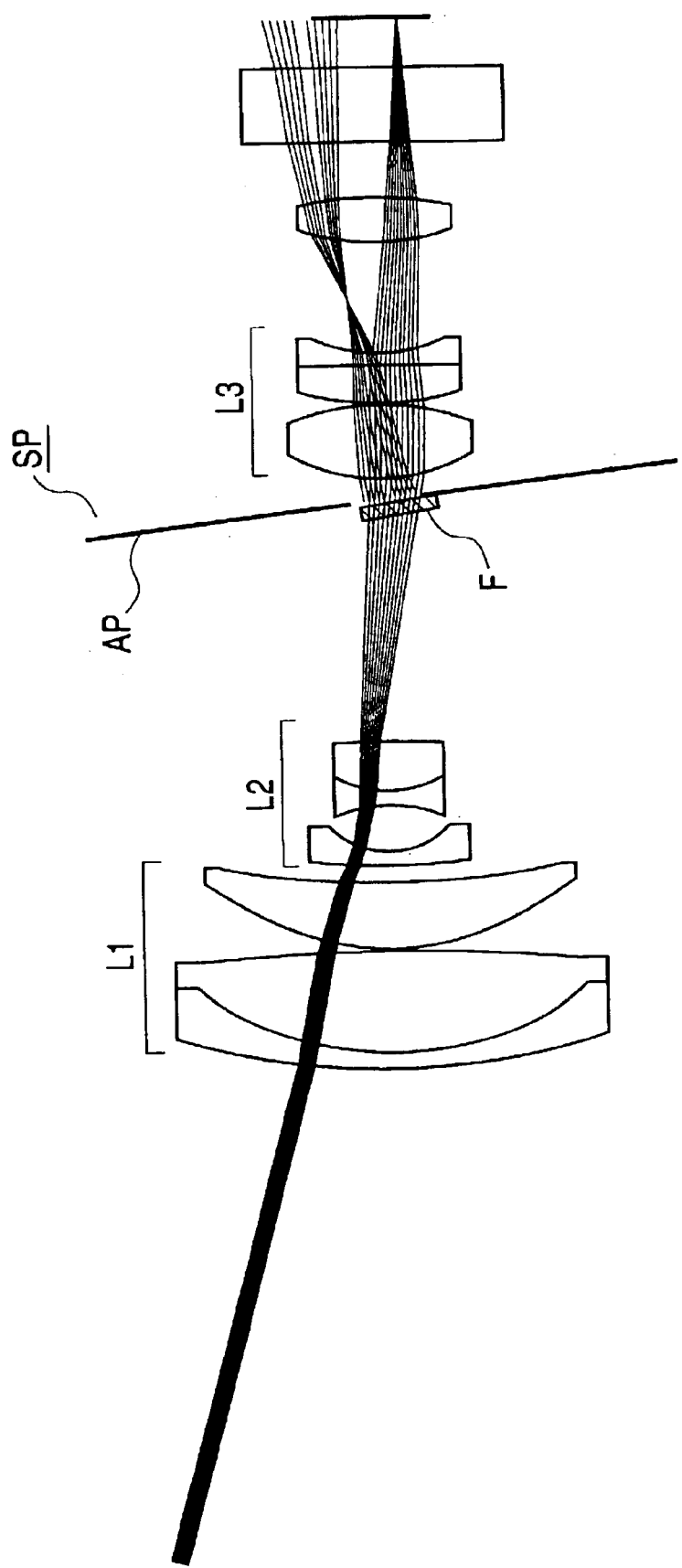
FIG. 6 shows the ghost ray optical path of the zoom lens of the third numerical embodiment.

FIG. 5 is a cross-sectional view of the essential portions of the zoom lens of a third embodiment (corresponding to a third numerical embodiment which will be described later) of the present invention, and FIG. 6 shows the optical path of ghost light in the zoom lens of the third embodiment, as in FIG. 2.

In the cross-sectional view of each embodiment, L1 designates a first lens unit of positive refractive power (optical power=inverse number of the focal length), L2 denotes a second lens unit of negative refractive power, L3 designates a third lens unit of positive refractive power, and L4 denotes a fourth lens unit of positive refractive power. SP designates an aperture stop unit disposed forwardly of the third lens unit L3, and it is stationary in case of zooming. G denotes a glass block corresponding to a color separating prism, a low-pass filter, a face plate, various filters or the like. IP designates an image plane on which is disposed a solid state image pickup element (photoelectric conversion element) such as a CCD sensor or a CMOS sensor or the photosensitive surface (image pickup surface) of a photosensitive material such as film.

In each embodiment, in case of zooming from the wide angle end to the telephoto end, as indicated by arrow in FIGS. 1, 3 and 5, the second lens unit L2 is moved to the image side for a magnification variation, and in order to correct any fluctuation of the image plane resulting from the magnification variation, the fourth lens unit L4 is moved to the object side so as to have a portion of a convex locus.

The first lens unit L1 and the third lens unit L3 are not moved for zooming.

Also, each embodiment adopts a rear focus type in which the fourth lens unit L4 is moved in the direction of the optical axis thereof to thereby effect focusing. Therefore, the movement locus of the fourth lens unit L4 during zooming differs depending on the object distance. The solid-line curve 4a and dotted-line curve 4b of the fourth lens unit L4 shown in FIGS. 1, 3 and 5 indicate the movement loci during the zooming from the wide angle end to the telephoto end when the lens is focused on an infinity object and a short distance object, respectively. As indicated by the curves 4a and 4b, the fourth lens unit L4 is moved during the zooming from the wide angle end to the telephoto end so as to have loci convex toward the object side to thereby achieve the effective utilization of the space between the third lens unit L3 and the fourth lens unit L4, and effectively achieve the shortening of the full length of the lens.

Also, focusing is effected by the compact and light-weight fourth lens unit L4 to thereby achieve the quickening of focusing and the saving of electric power consumption.

At the telephoto end, the focusing from the infinity object to the short distance object is effected by the fourth lens unit L4 being forwardly moved as indicated by a straight line 4c in FIGS. 1, 3 and 5.

The whole or part of the third lens unit L3 is moved (displaced) so as to have a component in a direction perpendicular to the optical axis to thereby correct the vibration of a photographed image when the entire optical system is vibrated (tilted) by hand vibration or the like.

The stop unit SP is disposed on the object side of the third lens unit L3, and changes the shape of its aperture by relatively displacing a plurality of stop blades (vanes) AP. Also, at least one of the plurality of stop blades AP is provided with a filter member F such as an ND filter for uniformly or partially adjusting (e.g. decreasing) the quantity of light passing through an aperture formed by the plurality of stop blades.

In each embodiment, the filter member F is secured to a stop blade. Thereby, as compared with a case where the filter member is constituted by a discrete member, the effective utilization of the space in the optical system is achieved and the downsizing of the optical system is achieved.

In FIGS. 1, 3 and 5, there is shown an example in which the filter member F is used on only one stop blade, but the plurality of stop blades may be provided with filters equal in transmittance or differing in area.

Now, when as shown in FIGS. 2, 4 and 6, light reflected by an image pickup surface is reflected by the filter member F through the fourth lens unit L4 and the third lens unit L3, and is again incident on the image pickup surface through the third lens unit L3 and the fourth lens unit L4, it becomes a ghost.

So, in the present embodiment, the plane of the stop blades AP and the plane of the filter member F are disposed in a vertical direction (widthwise direction) relative to the rectangular image pickup field of the image pickup surface while being inclined with respect to the optical axis La to thereby prevent the occurrence of the ghost in such a manner that ghost light travels toward the outside of the image pickup field.

The stop blades AP may be disposed perpendicularly to the optical axis and only the filter member F may be inclined with respect to the optical axis La. In this case, the filter member is provided independently relative to the stop blades AP and therefore, the area over which the filter member F covers the aperture can also be made to vary in conformity with the area of the stop aperture.

It is preferable that the filter member F be designed to differ in transmittance from one location on a light transmitting area to another. When a camera system is constituted by a filter member having a uniform transmittance and single density over the whole surface of the light transmitting area, for example, the difference between the quantity of light passing through a portion of the stop aperture in which the filter member is absent and the quantity of light passing through a portion of the stop aperture in which the filter member is present becomes great, and an uneven quantity of light occurs on the photographed image field. To alleviate this phenomenon, it is preferable that the density (the inverse number of the transmittance) of the filter member differ depending on the location through which the light passes, and particularly a construction in which the density varies gently (continuously) or stepwisely with respect to a direction in which the filter member is inserted (inclined) is desirable.

When a change in density is to be made at each location by the filter member, it is made by multi-layer film, whereby it becomes possible to control the change in density freely to some extent or to make the thickness of the filter necessary to provide density small. Thereby, the influence of the filter member inserted in the optical system upon the optical characteristic thereof becomes small, and the deterioration of the optical performance becomes little.

Further, it is preferable to adopt a construction in which the multi-layer film has a layer for reducing reflection. The presence of a flat plate like the filter member in the photographing optical system would cause ghost or flare. So, it becomes possible to give the function of anti-reflection film to the multi-layer film of the filter member to thereby reduce the ghost or flare.

Also, as previously described, in the present embodiment, the filter member F is inclined in the vertical direction of the camera (the shorter side direction of the photographing image field) with respect to the photographing image field of which the effective surface is rectangular. Usually, in the case of photographing by a camera, and particularly the photographing of a moving picture as by a video camera, when a recorded image is to be reproduced and appreciated, it is appreciated as by the use of a TV monitor. At this time, an upper side photographed by the camera coincides with the upper side of the monitor. At this time, it is often the case that a light source which most affects the ghost caused by the filter member F is the sunlight or a light or the like, but in terms of probability, any of them often exists on the upper side of the image field. So, it becomes possible to incline the filter member F in the vertical direction to thereby effectively direct ghost light to the outside of the photographing image field. It is also possible to incline the filter member F in the longer side direction (the right to left direction) of the photographing image field to thereby direct the ghost light to the outside of the photographing image field, but in this case, the angle at which the filter member F is inclined must be made great and a larger space becomes necessary to dispose the filter member and therefore, it is better to incline the filter member in the shorter side direction.

Here, when the composite focal length of the composite system of the third lens unit L3 and the fourth lens unit L4 when the focal length of the entire system is $f_M$ is defined as $f_{34}$, and the focal lengths of the entire system at the zoom positions of the wide angle end and the telephoto end are defined as fw and ft, respectively, and the lateral magnification and the angle of view of the composite system when the focal length of the entire system is $f_M$ are defined as $\beta_{34}$ and $\omega_M$, respectively (the angle of view $\omega_M$ is the angle of view in the shorter side direction of the image pickup surface), it is preferable that the angle of inclination θ of the surface of the filter member F with respect to the optical axis La satisfy the condition that $$\tan^{-1}[0.4 \cdot f_M \cdot \tan \omega_M \cdot (1+|\beta_{34}|)/f_{34}] < \theta < 15, \qquad (1)$$

where $$f_M = \sqrt{fw \cdot ft}.$$

Conditional expression (1) is a conditional expression which appropriately prescribes the angle of inclination θ of the filter member F. The composite focal length $f_{34}$ and lateral magnification $\beta_{34}$ of the composite system of the third lens unit L3 and the fourth lens unit L4 are concerned with it. If the angle of inclination θ is small beyond the lower limit of conditional expression (1), it will become difficult to direct the ghost to the outside of the photographing image field. If conversely, the angle of inclination θ is great beyond the upper limit of conditional expression (1), in order to dispose the filter member F, it will become necessary to secure much space so that the filter member F may not contact with what are disposed forwardly and rearwardly of the optical path of the filter member F, e.g. lenses, and it becomes disadvantageous to the downsizing of the entire lens system, and this is not preferable.

In the zoom lens of each embodiment, such a filter member F is used to decrease the quantity of light passing through the stop aperture, whereby even for a bright object, the diameter of the stop aperture is not made very small and the quantity of light incident on the image pickup surface is increased. When the stop is stopped down small (stopped down to a small stop), the deterioration of the quality of image caused by a diffracting phenomenon is prevented.

Also, as shown in FIGS. 2, 4 and 6, when an imaging beam incident on the image pickup surface is reflected by the image pickup surface and returns along the original optical path, and enters the filter member F through the fourth lens unit L4 and the third lens unit L3, the filter member F is disposed while being inclined so as to satisfy conditional expression (1) to thereby prevent the reflected light (harmful light) reflected by the surface of the filter member F from being incident on the image pickup surface also through the third lens unit L3 and the fourth lens unit L4.

That is, design is made such that the reflected light from the filter member F is incident on the outside of the effective area of the image pickup surface to thereby prevent the occurrence of ghost. Thereby, a good quality of image can be obtained.

Description will now be made of the feature of the lens construction of each embodiment.

To downsize the zoom lens, design is made such that when the focal length of the second lens unit L2 is defined as $f_2$, the condition that $$0.1 < |f_2/f_M| < 0.5 \qquad (2)$$

is satisfied.

Conditional expression (2) is a conditional expression for making the focal length (in other words, the power) of the second lens unit L2 proper. If the focal length of the second lens unit L2 becomes long beyond the upper limit value of conditional expression (2), it is preferable in the correction of aberrations, but to obtain a desired zoom ratio, the amount of movement of the second lens unit L2 must be made great, thus resulting in the bulkiness of the entire lens system, and this is not preferable. If conversely, the value $|f_2/f_m|$ is below the lower limit value of conditional expression, Petzual sum will become great in the negative direction and the image plane will become inclined and therefore, it will become difficult to keep good optical performance.

The third lens unit L3 has one or more positive lenses of which the opposite surfaces are aspheric surfaces in order to receive a beam coming in a divergent state from the second lens unit L3, thereby achieving improved optical performance. In each embodiment, the opposite surfaces of the positive lens most adjacent to the object side which constitutes the third lens unit L3 are made into aspheric surfaces.

The opposite surfaces of the positive lens in the third lens unit L3 which is most adjacent to the object side are made into aspheric surfaces to thereby effect the correction of various aberrations well. Particularly at the zoom position of the wide angle end, on-axis spherical aberration is corrected well. At this time, the shape of the aspheric surfaces is such a shape that positive refractive power becomes weaker from the center of the lens toward the peripheral portion of the lens, and the various aberrations are corrected well.

To achieve the downsizing of the entire lens system, it is important to make the beam (the effective diameter of the beam) sufficiently thin by the third lens unit L3, but originally a divergent light comes into the third lens unit L3 from the second lens unit L2 and therefore, to make the beam thin and make it emerge, the burden of the refractive power of the third lens unit L3 becomes great. So, in each embodiment, the positive lens in the third lens unit L3 is made into a lens of which the opposite surfaces are aspheric surfaces, to thereby keep a state in which the aberrations are good and yet make the beam thin. Thereby, the interval between the third lens unit L3 and the fourth lens unit L4 can be further shortened to thereby achieve the further downsizing of the entire lens system. Particularly, the refractive power of each surface of the positive lens of which the opposite surfaces are aspheric surfaces is set so that a divergent beam may be incident on the object side lens surface of the positive lens from the second lens unit L2 and be converged by this lens surface and a convergent beam may be incident on the image plane side lens surface thereof, thereby effecting the correction of the aberrations well.

Also, design is made such that when the focal length of the i-th lens unit is defined as $f_i$, at least one of the conditions that $$1.72 < f_1/f_M < 1.77 \quad (3)$$

$$0.9 < f_3/f_M < 1.3 \quad (4)$$

is satisfied.

Conditional expression (3) is a conditional expression for making the focal length of the first lens unit L1 proper. If the focal length of the first lens unit L1 becomes long beyond the upper limit value of conditional expression (3), the focal length of the entire lens system will become long, thus resulting in a great increase in the full length of the lens, and this is not preferable. If conversely, the value of $f_1/f_M$ is below the lower limit value of conditional expression (3), the burden of the refractive power of the first lens unit L1 will become great and good optical performance, particularly spherical aberration and chromatic aberration at the zoom position of the telephoto end will become aggravated, and this is not good.

Conditional expression (4) is a conditional expression for making the focal length of the third lens unit L3 proper. If the focal length of the third lens unit L3 becomes long beyond the upper limit value of conditional expression (4), the burden of the refractive power of the third lens unit L3 will become light and this is preferable in the correction of aberrations, but the burden of the refractive power of the fourth lens unit L4 will become great and the number of lenses in the fourth lens unit L4 must be increased or an aspheric lens must be disposed therein, and the downsizing of the entire lens system will become difficult. If conversely, the value of $f_3/f_M$ is below the lower limit value of conditional expression (4), the burden of the refractive power of the third lens unit L3 will become great, and good optical performance, particularly spherical aberration will become aggravated, and this is not good.

By conditional expressions (3) and (4) being satisfied, respective operational effects can be obtained, but it is desirable in the correction of aberrations that all conditional expressions be satisfied at a time.

First to third numerical embodiments corresponding to the numerical data of the zoom lenses of the first to third embodiments will be shown below. In each numerical embodiment, i indicates the order of the optical surface from the object side, Ri indicates the radius of curvature of the i-th optical surface (the i-th surface), Di indicates the interval between the i-th surface and the (i+1)th surface, and Ni and vi indicate the refractive index and Abbe number, respectively, of the i-th optical member for d-line. f represents the focal length, Fno represents F number, and ω represents a half angle of view.

Also, in the first, second and third numerical embodiments, the two surfaces most adjacent to the image side are surfaces constituting a glass block G corresponding to a color separating prism, a face plate, various filters or the like.

Also, when k is conicconstant, and B, C, D, E, F, . . . are aspheric surface coefficients, and the displacement in the direction of the optical axis at a height h from the optical axis is defined as x with the surface vertex as the reference, the aspherical shape is expressed by $$x = \frac{h^2/R}{1 + \{1 - (1+k)(h/R)^2\}^{1/2}} + Bh^4 + Ch^6 + Dh^8 + Eh^{10} + Fh^{12},$$

where R represents the radius of curvature.

For example, the indication "e-Z" means "$10^{-Z}$".

The relations between the aforementioned conditional expressions and the numerical values in the numerical embodiments are shown in Table 1 below.

First Numerical Embodiment f = 2.88 to 62.61    Fno = 1.65 to 3.65    2 ω = 53.4 to 2.6

| | | | |
|---|---|---|---|
| R1 = 32.796 | D1 = 0.99 | N1 = 1.846660 | v1 = 23.9 |
| R2 = 17.769 | D2 = 3.50 | N2 = 1.603112 | v2 = 60.6 |
| R3 = −260.959 | D3 = 0.15 | | |
| R4 = 16.478 | D4 = 2.40 | N3 = 1.696797 | v3 = 55.5 |
| R5 = 44.399 | D5 = Variable | | |
| R6 = 49.401 | D6 = 0.65 | N4 = 1.834000 | v4 = 37.2 |
| R7 = 3.727 | D7 = 1.81 | | |
| R8 = −12.141 | D8 = 0.55 | N5 = 1.834807 | v5 = 42.7 |
| R9 = 34.280 | D9 = 0.64 | | |
| R10 = 7.976 | D10 = 2.40 | N6 = 1.846660 | v6 = 23.9 |
| R11 = −7.976 | D11 = 0.00 | N7 = 1.846660 | v7 = 23.9 |
| R12 = −7.976 | D12 = 0.55 | N8 = 1.834000 | v8 = 37.2 |
| R13 = 13.863 | D13 = Variable | | |
| R14 = Stop | D14 = 0.80 | | |
| *R15 = 7.058 | D15 = 3.70 | N9 = 1.583126 | v9 = 59.4 |
| *R16 = −22.554 | D16 = 0.13 | | |
| R17 = 9.361 | D17 = 0.60 | N10 = 1.846660 | v10 = 23.9 |
| R18 = 5.710 | D18 = Variable | | |
| R19 = 9.121 | D19 = 2.80 | N11 = 1.516330 | v11 = 64.1 |
| R20 = −5.874 | D20 = 0.55 | N12 = 1.805181 | v12 = 25.4 |
| R21 = −10.712 | D21 = Variable | | |
| R22 = ∞ | D22 = 3.32 | N13 = 1.516330 | v13 = 64.2 |
| R23 = ∞ | | | |

| Focal Length Variale Interval | 2.88 | 13.44 | 62.61 |
|---|---|---|---|
| D5 | 0.60 | 11.43 | 16.15 |
| D13 | 17.62 | 6.80 | 2.07 |
| D18 | 8.45 | 4.59 | 9.60 |
| D21 | 2.00 | 5.86 | 0.86 |

* indicates aspheric surface.
Aspheric surface coefficient

| | | | |
|---|---|---|---|
| 15th surface: | k = −3.64446e+00<br>D = −4.43760e−07 | B = 1.06907e−03<br>E = 8.28666e−08 | C = −2.54832e−05<br>F = −2.48418e−09 |
| 16th surface | k = −1.24914e+01<br>D = 1.24208e−06 | B = 3.00127e−04<br>E = 3.45311e−10 | C = −2.90161e−05<br>F = −1.429e−09 |

Second Numerical Embodiment f = 2.58 to 24.85    Fno = 1.85 to 2.38    2 w = 50.3 to 5.6

| | | | |
|---|---|---|---|
| R1 = 31.508 | D1 = 0.95 | N1 = 1.846660 | v1 = 23.9 |
| R2 = 14.082 | D2 = 4.96 | N2 = 1.696797 | v2 = 55.5 |
| R3 = −130.554 | D3 = 0.15 | | |

-continued

| | | | |
|---|---|---|---|
| R4 = 11.869 | D4 = 2.35 | N3 × 1.696797 | v3 = 55.5 |
| R5 = 30.458 | D5 = Variable | | |
| R6 = 29.599 | D6 = 0.50 | N4 = 1.882997 | v4 = 40.8 |
| R7 = 3.514 | D7 = 1.65 | | |
| R8 = −4.666 | D8 = 0.50 | N5 = 1.743997 | v5 = 44.8 |
| R9 = 4.208 | D9 = 2.04 | N6 = 1.846660 | v6 = 23.9 |
| R10 = −21.180 | D10 = Variable | | |
| R11 = Stop | D11 = 0.90 | | |
| *R12 = 3.835 | D12 = 2.40 | N7 = 1.583126 | v7 = 59.4 |
| *R13 = −205.544 | D13 = 0.13 | | |
| R14 = 5.533 | D14 = 0.55 | N8 = 1.846660 | v8 = 23.9 |
| R15 = 3.395 | D15 = Variable | | |
| *R16 = 5.623 | D16 = 2.35 | N9 = 1.583126 | v9 = 59.4 |
| R17 = −4.457 | D17 = 0.50 | N10 = 1.846660 | v10 = 23.9 |
| R18 = −11.017 | D18 = Variable | | |
| R19 = ∞ | D19 = 2.81 | N11 = 1.516330 | v11 = 64.1 |
| R20 = ∞ | | | |

| Focal Length Variable Interval | 2.58 | 7.99 | 24.85 |
|---|---|---|---|
| D5 | 0.48 | 6.17 | 9.59 |
| D10 | 10.59 | 4.90 | 1.48 |
| D15 | 3.48 | 1.86 | 2.78 |
| D18 | 2.00 | 3.62 | 2.70 |

* indicates aspheric surface.
Aspheric surface coefficient

| | | | |
|---|---|---|---|
| 12th: surface | k = −2.61918e+00 D = 1.26130e−05 | B = 4.88872e−03 E = 1.15105e−06 | C = −1.53963e−04 F = −1.09076e−08 |
| 13th: surface | k = 9.06059e+02 D = 2.23869e−05 | B = 1.69227e−03 E = −2.39673e−07 | C = 1.92867e−05 F = 2.54864e−07 |
| 16th: surface | k = 1.33896e+01 D = −2.80274e−04 | B = 7.63907e−03 E = 7.62791e−05 | C = −2.82305e−04 F = −6.14683e−06 |

Third Numerical Embodiment f = 3.69 to 34.83    Fno = 1.85 to 2.66    2γ = 52.0 to 5.9

| | | | |
|---|---|---|---|
| R1 = 28.915 | D1 = 0.65 | N1 = 1.805181 | v1 = 25.4 |
| R2 = 12.598 | D2 = 3.87 | N2 = 1.603112 | v2 = 60.6 |
| R3 = −88.788 | D3 = 0.12 | | |
| R4 = 11.051 | D4 = 2.61 | N3 = 1.696797 | v3 = 55.5 |
| R5 = 34.127 | D5 = Variable | | |
| R6 = 24.778 | D6 = 0.50 | N4 = 1.772499 | v4 = 49.6 |
| R7 = 3.451 | D7 = 1.80 | | |
| *R8 = −4.837 | D8 = 0.58 | N5 = 1.665320 | v5 = 55.4 |
| R9 = 4.193 | D9 = 1.79 | N6 = 1.805181 | v6 = 25.4 |
| R10 = 149.426 | D10 = Variable | | |
| R11 = Stop | D11 = 0.80 | | |
| *R12 = 6.008 | D12 = 2.87 | N7 = 1.583126 | v7 = 59.4 |
| *R13 = −9.664 | D13 = 0.12 | | |
| R14 = 12.740 | D14 = 1.40 | N8 = 1.712995 | v8 = 53.9 |
| R15 = 392.839 | D15 = 0.50 | N9 = 1.846660 | v9 = 23.8 |
| R16 = 6.058 | D16 = Variable | | |
| *R17 = 9.471 | D17 = 1.71 | N10 = 1.516330 | v10 = 64.1 |
| R18 = −16.470 | D18 Variable | | |
| R19 = ∞ | D19 = 2.96 | N11 = 1.516330 | v11 = 64.1 |
| R20 = ∞ | | | |

| Focal Length Variable Interval | 3.69 | 11.35 | 34.83 |
|---|---|---|---|
| D5 | 0.67 | 5.68 | 8.74 |
| D10 | 9.48 | 4.48 | 1.41 |
| D16 | 4.20 | 1.52 | 4.55 |
| D18 | 2.00 | 4.68 | 1.65 |

* indicates aspheric surface.
Aspheric surface coefficient

| | | | |
|---|---|---|---|
| 8th: surface | k = −4.93661e+00 D = 3.82000e−05 | B = −5.26492e−03 E = −1.02467e−05 | C = 9.96493e−05 F = 3.52663e−07 |
| 12th: surface | k = −3.64162e+00 D = −4.10179e−07 | B = 8.46158e−04 E = −3.86072e−08 | C = −1.57792e−05 |
| 13th: surface | k = 2.82647e+00 D = −2.92979e−06 | B = −8.13232e−05 E = 4.39152e−08 | C = 2.83364e−05 |

-continued

| | | | |
|---|---|---|---|
| 17th: surface | k = −5.92187e−01 D = −2.91028e−06 | B = −1.14341e−04 E = 7.55644e−07 | C = −2.76062e−05 F = −4.93722e−08 |

| | Numerical Embodiment | | |
|---|---|---|---|
| Conditional Expression | 1 | 2 | 3 |
| (1) $0.4 \cdot f_m \cdot \tan\omega_m \cdot (1 + \|\beta_{34}\|) / f_{34}$ | 3.0 | 4.0 | 6.3 |
| (2) | 0.275 | 0.387 | 0.263 |
| (3) | 1.807 | 2.179 | 1.426 |
| (4) | 1.127 | 1.225 | 0.812 |

An embodiment of a video camera using the zoom lens of the present invention as a photographing optical system will now be described with reference to FIG. 7.

Figure 7:
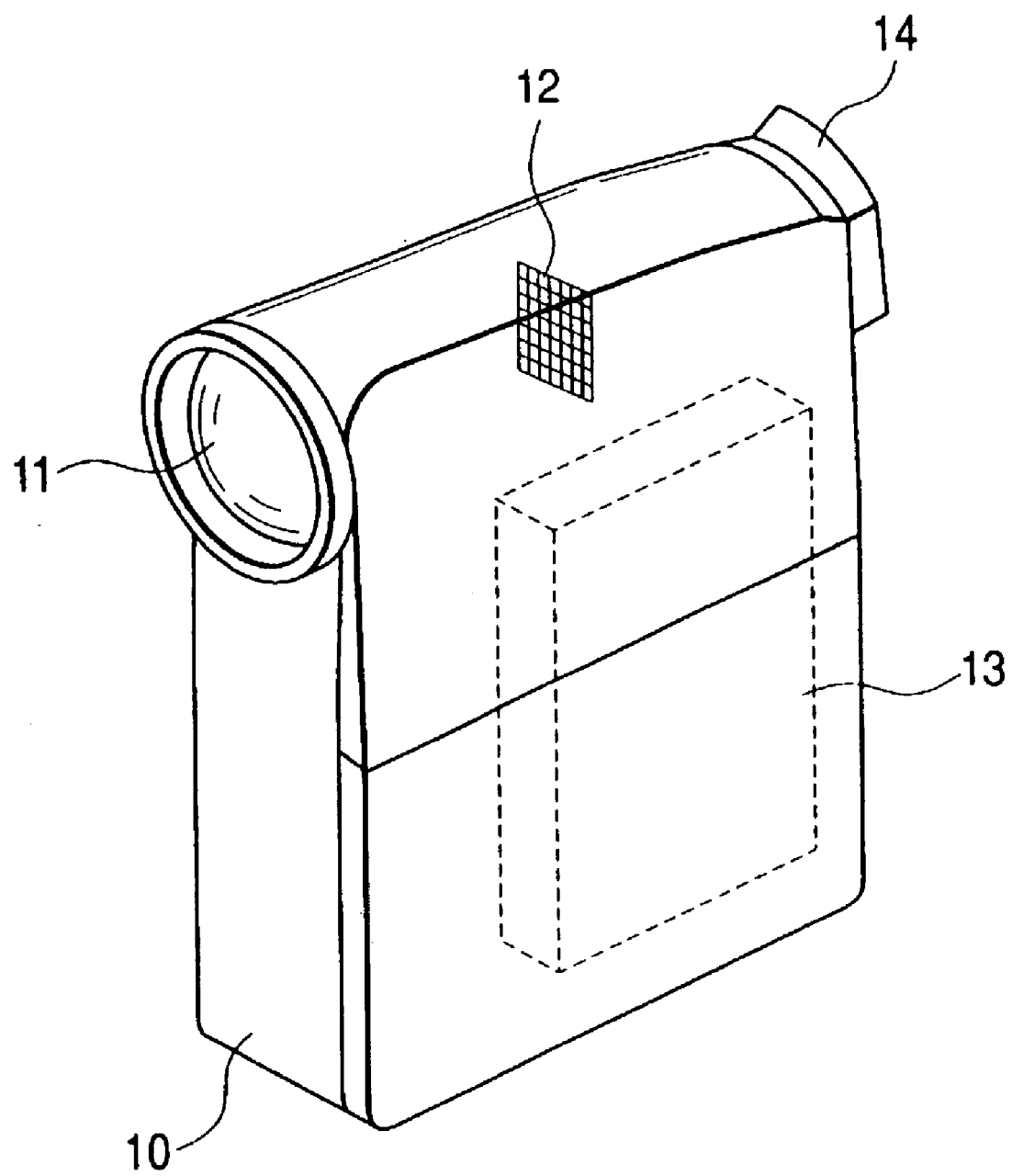
FIG. 7 is a view for illustrating an embodiment of a video camera provided with the zoom lens of the present invention.

In FIG. 7, the reference numeral 10 designates the main body of the video camera, the reference numeral 11 denotes a photographing optical system constituted by the zoom lens of the present invention, the reference numeral 12 designates a solid state image pickup element (photoelectric conversion element) such as a CCD sensor or a CMOS sensor for receiving an object image by the photographing optical system 11, the reference numeral 13 denotes a memory for recording the object image received by the solid state image pickup element 12 as electrical information, and the reference numeral 14 designates a finder for observing therethrough the object image displayed on a display element, not shown. The display element is constituted by a liquid crystal panel or the like, and the object image formed on the solid state image pickup element 12 is displayed thereby.

By applying the zoom lens of the present invention to an image taking apparatus (optical apparatus) such as a video camera as described above, it is possible to realize an optical apparatus which is compact and has high optical performance and which suffers little from ghost or flare.

What is claimed is:

1. A zoom lens system comprising, in succession from the front to the rear:

a first lens unit of positive power;

a second lens unit of negative power moved during zooming;

a stop unit having a stop blade forming an aperture, and a filter member for attenuating the quantity of light passing through the aperture, the filter member being so disposed as to be inclined with respect to the optical axis of the zoom lens system;

a third lens unit of positive power; and a fourth lens unit of positive power moved during zooming.

2. A zoom lens system according to claim 1, wherein the filter member differs in transmittance depending on a location through which ray passes.

3. A zoom lens system according to claim 2, wherein the filter member has multi-layer film.

4. A zoom lens system according to claim 3, wherein the multi-layer film has a layer for suppressing reflection.

5. A zoom lens system according to claim 1, wherein the following condition is satisfied:

$$\tan^{-1}(0.4 \cdot f_M \cdot \tan \omega_M \cdot (1+|\beta_{34}|)/f_{34}) < \theta < 15,$$

where θ is the angle of inclination of the filter member with respect to the optical axis, fw and ft are the focal lengths of the entire system at the wide angle end and the telephoto end, respectively, $f_{34}$ is the focal length of a composite part comprising the third lens unit and the fourth lens unit at the zoom position of the focal length $f_M=\sqrt{fw \cdot ft}$ of the entire system, and $\beta_{34}$ and $\omega_M$ are the lateral magnification of the composite part at the zoom position of the focal length $f_M=\sqrt{fw \cdot ft}$ of the entire system and the angle of view at the zoom position of the focal length $f_M=\sqrt{fw \cdot ft}$ of the entire system, respectively.

6. A zoom lens system according to claim 1, wherein the following condition is satisfied:

$$0.1 < |f_2/f_M| < 0.5$$

where $f_2$ is the focal length of the second lens unit and $f_M=\sqrt{fw \cdot ft}$ wherein fw and ft are the focal lengths of the entire system at the wide angle end and the telephoto end, respectively.

7. A zoom lens system according to claim 1, wherein the following condition is satisfied:

$$1.72 < f_1/f_M < 1.77$$

where $f_1$ is the focal length of the first lens unit and $f_M=\sqrt{fw \cdot ft}$ wherein fw and ft are the focal lengths of the entire system at the wide angle end and the telephoto end, respectively.

8. A zoom lens system according to claim 1, wherein the following condition is satisfied:

$$0.9 < f_3/f_M < 1.3$$

where $f_3$ is the focal length of the third lens unit and $f_M=\sqrt{fw \cdot ft}$ wherein fw and ft are the focal lengths of the entire system at the wide angle end and the telephoto end, respectively.

9. A zoom lens system according to claim 1, wherein the fourth lens unit is moved for focusing.

10. A zoom lens system according to claim 1, wherein at least part of the third lens unit is moved so as to have a component in a direction perpendicular to the optical axis.

11. A zoom lens system according to claim 1, wherein the stop blade is disposed perpendicularly to the optical axis.

12. A zoom lens system according to claim 1, wherein the stop blade is so disposed as to be inclined in the same direction as the direction of inclination of the filter member.

13. A zoom lens system according to claim 1, wherein the stop unit has a plurality of stop blades, and the stop unit changes the relative position of the plurality of stop blades to thereby change the area of the aperture.

14. A zoom lens system according to claim 13, wherein the filter member is fixed to one of the plurality of stop blades.

15. A zoom lens system according to claim 1, which forms an image on a solid state image pickup element.

16. An image taking apparatus comprising:
 a zoom lens comprising:
  a first lens unit of positive power;
  a second lens unit of negative power moved during zooming;
  a stop unit having a stop blade forming an aperture, and a filter member for attenuating the quantity of light passing through the aperture, the filter member being so disposed as to be inclined with respect to the optical axis of the zoom lens;
  a third lens unit of positive power;
  a fourth lens unit of positive power moved during zooming; and
  a solid state image pickup element for receiving an image formed by the zoom lens.

17. An image taking apparatus according to claim 16, wherein the effective image pickup surface of the solid state image pickup element is rectangular, and the filter member is so disposed as to be inclined with respect to the widthwise direction of the effective image pickup surface.

18. An image taking apparatus according to claim 17, wherein the following condition is satisfied:

$$\tan^{-1}(0.4 \cdot f_M \cdot \tan \omega_M \cdot (1+|\beta_{34}|)/f_{34}) < \theta < 15,$$

where $\theta$ is the angle of inclination of the filter member with respect to the optical axis, fw and ft are the focal lengths of the zoom lens at the wide angle end and the telephoto end, respectively, $f_{34}$ is the focal length of a composite part comprising the third lens unit and the fourth lens unit at the zoom position of the focal length $f_M=\sqrt{fw \cdot ft}$ of the entire system, and $\beta_{34}$ and $\omega_M$ are the lateral magnification of the composite part at the zoom position of the focal length $f_M=\sqrt{fw \cdot ft}$ of the zoom lens and the angle of view of the zoom lens in the widthwise direction of the effective image pickup surface at the zoom position of the focal length $f_M=\sqrt{fw \cdot ft}$ of the zoom lens, respectively.

* * * * *